INVENTOR
Thomas Cropper Ryley Shepherd
BY
Russell & Moore
ATTORNEYS

United States Patent Office 3,371,871
Patented Mar. 5, 1968

3,371,871
WASTE DISPOSAL INSTALLATIONS
Thomas Cropper Ryley Shepherd, Arbour Hill,
Herefordshire, Ross-on-Wye, England
Filed May 20, 1965, Ser. No. 457,402
5 Claims. (Cl. 241—43)

ABSTRACT OF THE DISCLOSURE

A waste disposal installation for the disposal of solid waste material particularly from office buildings or blocks of flats. The waste, together with water, is fed down a duct to be delivered on a sloping wall of a disposal chamber which leads down to a sump. Reducing apparatus in the wall of the chamber above the sump breaks up the large articles of waste and agitates the water in the chamber so that the reduced waste is dispersed in the water. The water containing dispersed waste passes out of an outlet above the reducing apparatus and is fed via a comminutor to drain. A grid may be positioned across the chamber above the comminuting apparatus with an overflow pipe leading from the chamber above the grid.

This invention concerns installations for the disposal of solid waste more especially household and kitchen waste and sewage received from domestic, office or the like disposal units, such as in blocks of flats wherein the waste, with or without flushing water, from a group of units is discharged through a common waste pipe.

According to the invention there is provided an installation for the disposal of solid waste material comprising a chamber to receive the waste and a supply of water, reducing apparatus carried in walling of said chamber to break up solid waste received within the chamber and agitate the water in the chamber so that the reduced waste is dispersed in the water, comminuting apparatus located to receive from an outlet of said chamber the water and the reduced waste dispersed therein to comminute the reduced waste, and means to discharge the comminuted waste and water to drain from said comminuting apparatus.

Advantageously said reducing apparatus is presented in sloping walling of said chamber and above the lowest level of the chamber.

Embodiments of the invention are hereinafter described by way of example with reference to the accompying drawings wherein.

Figure 1:
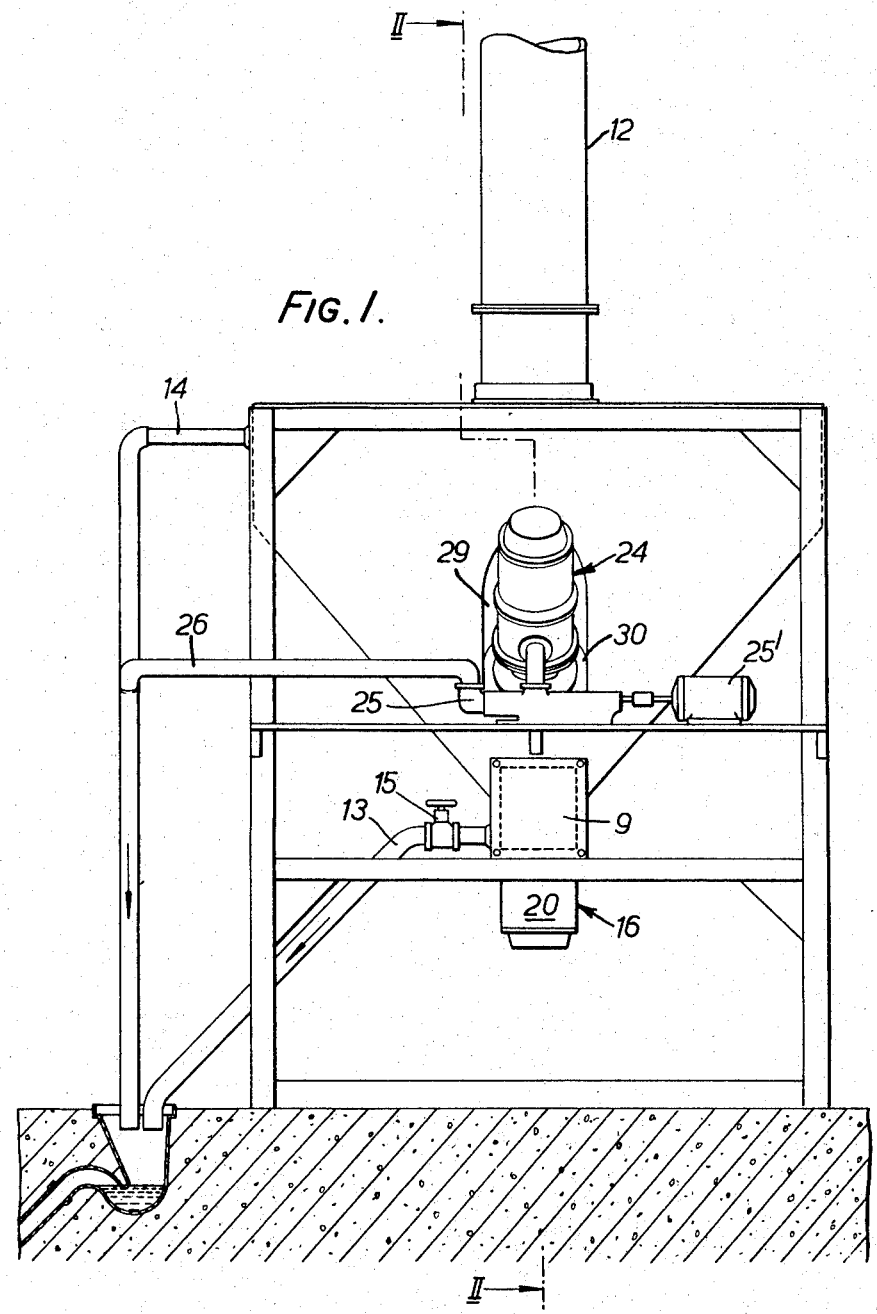
FIG. 1 is an end elevation of one embodiment.
Figure 2:
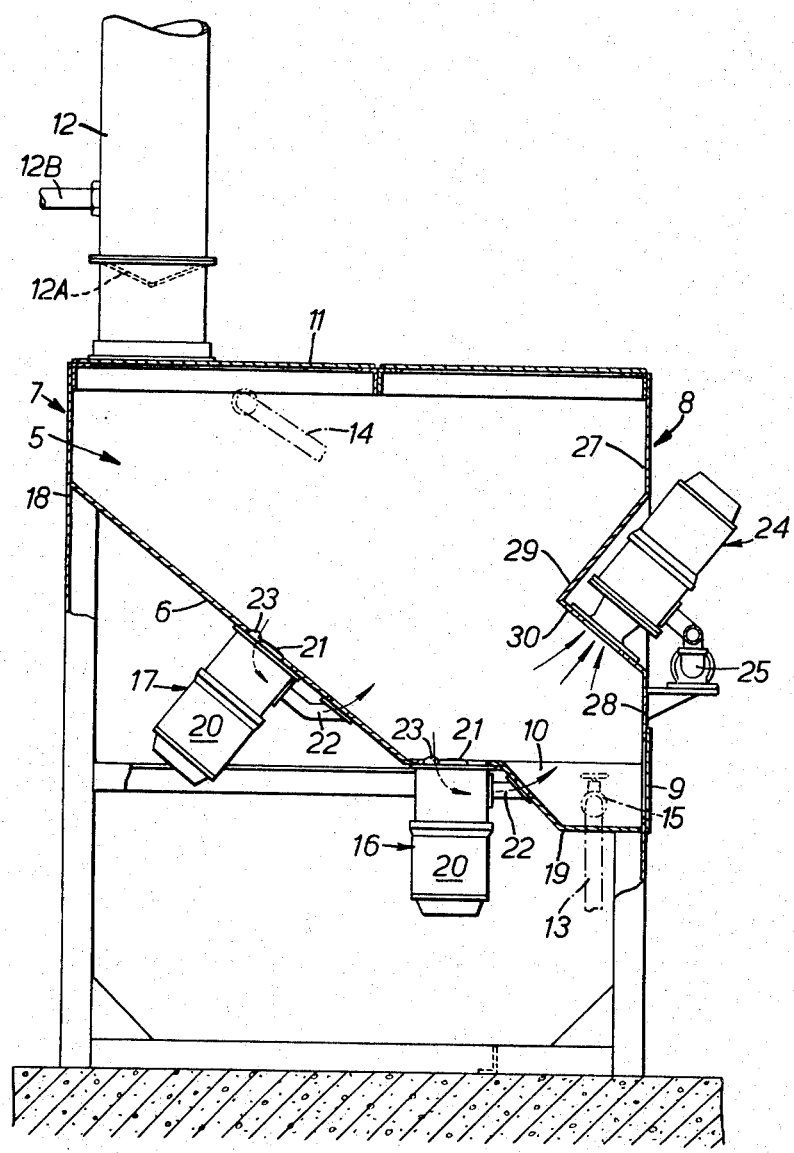
FIG. 2 is a sectional side view on the line II—II of FIG. 1.

In the embodiment of FIGS. 1 and 2, the installation comprises a waste-receiving chamber 5 which in end elevation has a generally hopper shape and in side view has a bottom walling 6 which slopes downwardly from one vertical side 7 to the opposite side 8. The lower part of side 8 has a removable door 9 by which material of non-suspensible character can be withdrawn from a sump portion 10 of the chamber. Above the upper end of the sloping walling and carried by the top 11 of the chamber is a vertical duct 12 down which the waste is discharged from the several dwellings or offices. The duct 12 presents a flexible diaphragm 12A e.g. of plastics material split in sections to prevent noise and swell rising up the duct. The waste from the duct passes through an opening in the chamber top and on to the chamber bottom walling 6. That portion of such walling immediately beneath the duct may be reinforced.

Water is supplied to the chamber, preferably above the diaphragm 12A such as at 12B, by an electrically-driven pump or header tank under the control of a float switch or valve to maintain a constant level of water in the chamber. Such means are per se known and therefore not illustrated.

An output pipe 13 is provided to drain the chamber e.g. when opening the sump door and an overflow pipe 14 is also provided. A manual valve 15 controls the outflow through pipe 13.

A pair of reducing apparatuses 16, 17 are provided, spaced apart between the upper and lower edges 18, 19 of the chamber bottom walling 6. Each apparatus comprises an electric motor 20 and a rotor 21 driven by the motor. Each apparatus is secured to the outer surface of the chamber bottom walling and the rotor is exposed to the interior of the chamber through an opening therein (see FIG. 2). It is arranged that water flow from the chamber into and around the rotor 21 and the water is returned to the chamber through a pipe 22. In this way a vigorous circulation of water is produced.

Each rotor 21 is so constructed and arranged as to be capable of breaking up or tending to break up solid objects (tin cans, bottles, metal objects, fibrous materials and so on) into smaller pieces, and assists in maceration of materials which are softened by the water. The reduced pieces will be dispersed in the vigorously circulating water while larger pieces will either be reintroduced to the rotor due to the water circulation or will fall into the sump portion 10.

Each rotor 21 may have ripping claws or the like 23 and the inner surface of the bottom walling of the chamber (e.g. in the immediate vicinity of one or both reducing apparatus 16, 17) may have upstanding hooks or the like so that materials can be torn apart between the hooks and the rotor claws.

A comminuting apparatus 24 is provided to deal with the smaller pieces of waste dispersed in the water further to break them up and to reduce them to a size that they may be acceptably disposed of into a drain. The comminuting apparatus draws water and dispersed waste from the chamber—for instance, a pump 25 driven by an electric motor 25' is provided to draw the water/waste from the chamber into the comminuting apparatus. The comminuted waste and the water passes through the pump by pipe 26 to drain. The comminuting apparatus is preferably above the level of the reducing apparatuses 16, 17 and draws material from the chamber in the region of side 8 but not directly from the sump 10. To this end, side 8 has a vertical part 27 at the top thereof and another vertical part 28 at the bottom thereof and there is an intermediate part 29 of L form, the intermediate part constituting a recess in said wall. The floor portion 30 of the recess towards the chamber bottom 6 in the region of the reducing apparatus 16 i.e. somewhat beyond the sump portion 10. The comminuting apparatus 24 is mounted above the floor of the recess and draws water and material directly from the chamber in the region referred to.

The reducing and comminuting apparatuses may be intermittently or continuously driven. For instance, they may be brought into operation automatically at predeterminal intervals of time and may be in operation for a specified time.

Figure 3:
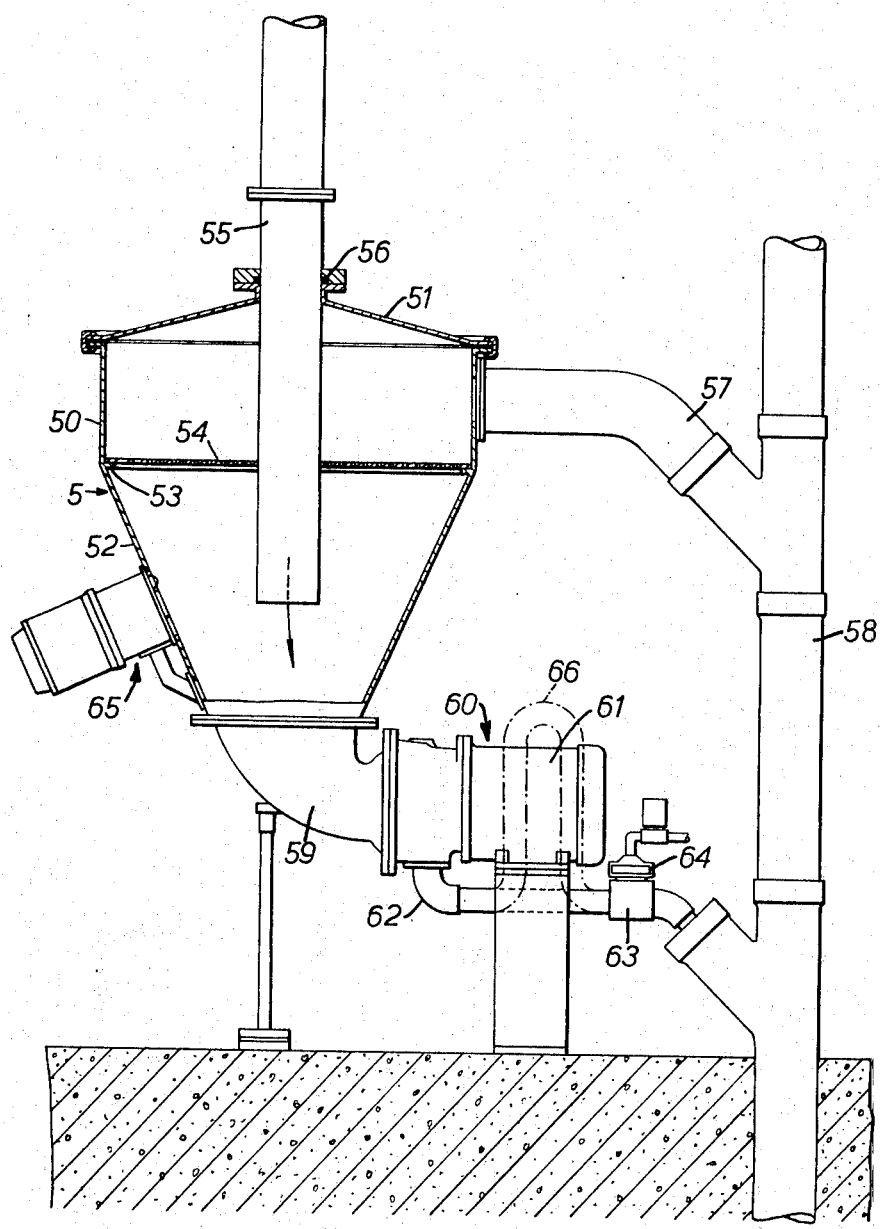
FIG. 3 is a part-sectional elevation of another embodiment.

In the installation illustrated in FIG. 3, the chamber 5 has an upper cylindrical part 50 (with a sealed inspection cover 51 over the top) and a depending, frustoconical lower part 52 presenting sloping walling integral with the lower edge of the upper part. A ledge 53 around the inside top portion of the lower part supports a perforated grid plate 54 which divides the chamber into upper and lower compartments.

A common waste pipe 55 passes centrally through the cover downwardly into the chamber to below the grid plate. To this end the latter has a central hole closely to receive the waste pipe. The waste pipe is sealed to the cover at 56 in any convenient manner.

An overflow pipe 57 extends sideways from the upper compartment of the chamber with which it communicates. The overflow leads into a vertical down drain pipe 58. The pipe 57 is a short distance above the grid plate to allow a small head of water above the plate.

The bottom outlet of the chamber communicates with an elbow pipe 59. The elbow is connected to a comminuting apparatus 60 comprising an electric motor 61 to drive a rotary impeller which co-acts with a ring of teeth to comminute material delivered to the apparatus, in manner known per se and therefore not illustrated, from the chamber through the elbow. The comminuted waste is discharged from the apparatus through a pipe 62 which leads to the vertical down pipe 58.

The discharge pipe 62 incorporates a valve 63 (e.g. a diaphragm valve) which is actuated by a solenoid device 64 to control the time during which the valve is open and closed.

An electrically-driven reducing apparatus 65 (or more than one such apparatus) is provided as described above for the purpose indicated, the apparatus being presented by the sloping walling in the lower compartment of the chamber.

In use: waste with flushing water enters the chamber through the common waste pipe 55 and is retained in the chamber below the grid plate 54. Solids and nonsoluble material collect in the chamber with the water overlying them. As the waste collects the water will pass up through the grid plate until excess water collecting above the plate flows through the overflow pipe 57 to the vertical sewer pipe 58 and so to drain. When the water level is at, or above, the grid plate waste of low density (e.g. paper) which will float will be held against the under surface of the grid plate.

When the apparatuses 60, 65 are started the water is agitated and the waste is broken up into smaller pieces by the reducing apparatus 65 within chamber 5, the smaller pieces being then drawn from the chamber through the elbow 59 and treated by the comminuting appartus 60, the comminuted waste being delivered through the discharge pipe to the vertical sewer pipe.

Low-density material held against the undersurface of the grid plate is forced downwardly away therefrom by movement of the water above the grid plate. It is thereby ensured that such material is carried down into the lower part of chamber 5 and thence to the comminuting apparatus. Of course if the lower part of the chamber is only partly filled with water and waste material, low-density material floating in the water will be carried down to the apparatus as the chamber is emptied.

The diaphragm valve 63 is actuated by the solenoid 64 so that the valve opens and closes automatically in predetermined sequence as a control means to ensure that the waste does not flow through the comminuting apparatus at a rate in excess of that at which the waste can be adequately comminuted. In addition to or instead of a solenoid-actuated valve the discharge pipe 62 may incorporate a portion 66 of inverted U-form as shown chain dotted in FIG. 3 with such a pipe there is a syphonic action which results in the flow of waste to the installation being intermittent with the creation of an intermittent reverse flow which induces a stirring action and again ensures that material is not fed through the apparatus at an excessive rate.

An installation in accordance with this invention is particularly suitable for the disposal of fibrous waste, more especially santiary towels, and by the provision of the reducing apparatus, bottles, ash, and other solid materials are broken up to a size adequate for the comminuting apparatus which further reduces the material to a fine granular or power-like material suitable for discharge into a drain.

I claim:
1. An installation for the disposal of solid waste material comprising:
 (a) a chamber to receive the waste and a supply of water said chamber having a sump portion and a sloping walling leading downwardly to the sump portion,
 (b) a reducing apparatus carried in said sloping wall above the level of the sump portion to break up solid waste material received within the chamber and agitate the water in the chamber so that the reduced waste is disposed in the water,
 (c) a duct connected with the chamber to deliver said waste material onto said sloping walling above the level of the reducing apparatus,
 (d) an outlet from the chamber for the discharge of water and reduced waste disposed therein from the chamber,
 (e) a comminuting apparatus which receives the water and reduced waste discharged through said outlet to comminute the reduced waste, said comminuting apparatus being at a higher level than said reducing apparatus, and
 (f) means to discharge the comminuted waste and water to drain from said comminuting apparatus.

2. An installation for the disposal of solid waste material comprising:
 (a) a chamber to receive the waste and a supply of water,
 (b) reducing apparatus carried in walling of said chamber to break up solid waste received within the chamber and agitate the water in the chamber so that the reduced waste is dispersed in the water,
 (c) comminuting apparatus located to receive from an outlet of said chamber the water and the reduced waste dispersed therein to comminute the reduced waste,
 (d) means to discharge the comminuted waste and water to drain from said comminuting apparatus, and
 (e) a grid plate located across an upper part of said chamber to divide the chamber into upper and lower compartments, the waste to be disposed of being received into the lower compartment, said reducing and comminuting apparatuses communicate with the lower compartment, and an overflow pipe leads from the upper compartment to the drain.

3. An installation according to claim 2 wherein said chamber outlet is located at the bottom of the chamber, and means is provided to control flow of waste through said comminuting apparatus.

4. An installation according to claim 3 wherein said control means comprises a solenoid-actuaed valve controlling discharge of comminuted waste from said comminuting apparatus.

5. An installation according to claim 3 wherein said control means comprises a discharge pipe portion of inverted U-form to receive comminuted waste from said comminuting apparatus.

References Cited

UNITED STATES PATENTS

| | | | |
|---|---|---|---|
| 1,459,713 | 6/1923 | Beggs | 241—38 |
| 1,828,589 | 10/1931 | Bates | 241—42 |
| 2,286,520 | 6/1942 | Tranbarger | 241—100.5 |
| 2,616,340 | 11/1952 | Knoll | 92—26 |
| 2,756,646 | 7/1956 | Jones | 241—46 |
| 2,938,674 | 5/1960 | Lee | 241—46 |
| 2,969,927 | 1/1961 | Vaucher | 241—46 |
| 3,188,942 | 6/1965 | Wandel | 241—46 XR |

HARRISON L. HINSON, *Primary Examiner.*